(12) United States Patent
Clement et al.

(10) Patent No.: US 6,770,838 B1
(45) Date of Patent: Aug. 3, 2004

(54) RELEASING OF GLAZING PANELS

(75) Inventors: Robert Marc Clement, Pontardawe (GB); Christopher Davies, Kidwelly (GB); Michael Noel Kiernan, Swansea (GB)

(73) Assignee: Carglass Luxenbourg Sarl-Zug Branch, Zug (CH)

( * ) Notice: Subject to any disclaimer, the term of this patent is extended or adjusted under 35 U.S.C. 154(b) by 0 days.

(21) Appl. No.: 09/184,186

(22) Filed: Nov. 2, 1998

Related U.S. Application Data

(63) Continuation-in-part of application No. 09/133,854, filed on Aug. 14, 1998, which is a continuation of application No. 08/693,060, filed on Aug. 13, 1996, now abandoned, which is a continuation of application No. PCT/GB95/02847, filed on Dec. 6, 1995.

(30) Foreign Application Priority Data

Dec. 7, 1994 (GB) .............................................. 9424659
Aug. 11, 1998 (GB) .............................................. 9817441

(51) Int. Cl.[7] .............................................. B23K 26/00
(52) U.S. Cl. .............................. 219/121.61; 219/121.85
(58) Field of Search ....................... 219/121.61, 121.85, 219/121.6, 121.65, 121.66, 121.73; 156/272.8, 344, 584, 272.2

(56) References Cited

U.S. PATENT DOCUMENTS

| | | | |
|---|---|---|---|
| 3,242,314 A | 3/1966 | Eckles | |
| 3,392,259 A | 7/1968 | Meier | |
| 3,464,534 A | 9/1969 | Muncheryan | |
| 4,635,415 A | 1/1987 | Schumacher et al. | |
| 4,743,091 A | 5/1988 | Gelbart | |
| 4,804,975 A | 2/1989 | Yip | |
| 4,808,789 A | 2/1989 | Muncheryan | |
| 5,061,332 A | 10/1991 | Stolz et al. | 156/94 |
| 5,269,868 A * | 12/1993 | Gofuku et al. | 156/344 |
| 5,272,716 A | 12/1993 | Soltz et al. | |
| 5,423,931 A | 6/1995 | Inoue et al. | |
| 5,468,238 A | 11/1995 | Mersch | |
| 5,580,471 A | 12/1996 | Fukumoto et al. | |
| 5,895,589 A * | 4/1999 | Rodgers et al. | 219/121.76 |
| 6,558,493 B1 * | 5/2003 | Ledger et al. | 156/98 |

FOREIGN PATENT DOCUMENTS

| | | | |
|---|---|---|---|
| CA | 2073092 | 1/1993 | ........... F16J/15/10 |
| CN | 2073092 * | 1/1993 | ........... F16J/15/10 |
| DE | 43 20 341 | 12/1994 | |
| EP | 0185 139 | 6/1986 | |
| EP | 0 215 960 | 4/1987 | |
| EP | 0 217 019 | 4/1987 | |
| EP | 0319023 | 12/1988 | ........... B29C/65/36 |
| EP | 0377376 | 12/1989 | ........... B60J/10/02 |
| EP | 0492786 | 11/1991 | ............. C09J/5/06 |
| EP | 0 521 825 | 1/1993 | |
| EP | 0 603 047 | 6/1994 | |
| EP | 0 762 409 | 3/1997 | |
| FR | 8210473 | 6/1982 | ........... H06B/3/26 |
| JP | 820056691 | 10/1983 | ........... B29C/27/10 |
| JP | 7155978 | 6/1995 | |
| JP | 11267627 * | 10/1999 | |
| RU | 1789150 | 1/1993 | |
| RU | 2008042 | 2/1994 | |
| WO | 96/17737 * | 6/1996 | ............. B60J/1/00 |

* cited by examiner

Primary Examiner—M. Alexandra Elve
(74) Attorney, Agent, or Firm—Merchant & Gould P.C.

(57) ABSTRACT

Glazing panels such as vehicle windscreens bonded to a supporting frame are released by firstly arranging light energy delivery means adjacent the panel and subsequently transmitting light energy from the delivery means through the panel thereby to effect release of the panel from the frame. The light may be pulsed according to a predetermined regime and may be delivered by a discharge lamp having rapidly attenuating intensity, or quasi continuous wave pulsed laser. The mechanism of panel release may be by thermal degradation of the bonding material, cleavage of material at a surface of, or within the body of the panel, or a combination of such mechanisms.

30 Claims, 4 Drawing Sheets

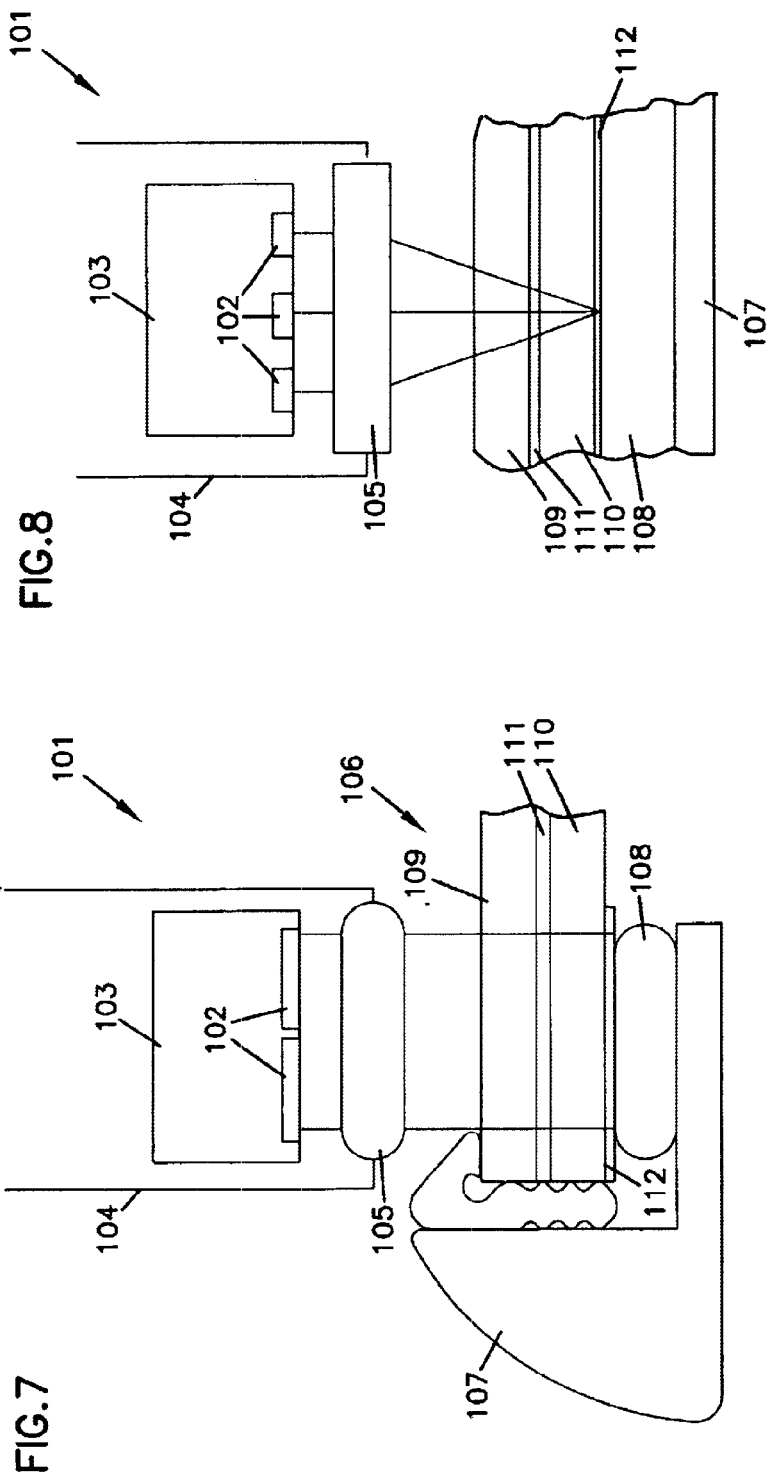
FIG.8
FIG.7
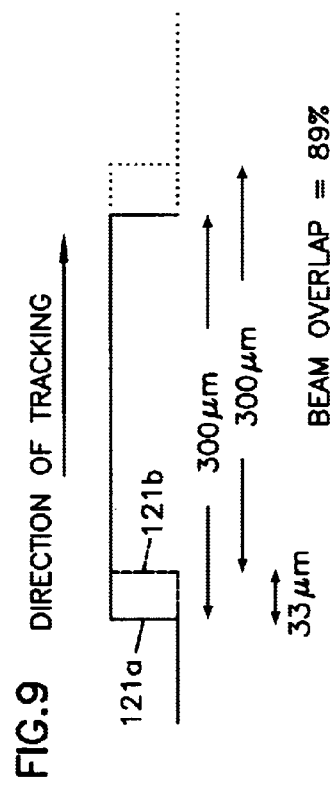
FIG.9 DIRECTION OF TRACKING
BEAM OVERLAP = 89%

RELEASING OF GLAZING PANELS

The present application is a Continuation-In-Part of U.S. patent application Ser. No. 09/133,854, filed Aug. 14, 1998, which is a continuation of U.S. patent application Ser. No. 08/693,060, filed Aug. 13,1996 now abandoned.

FIELD OF THE INVENTION

The present invention relates to the releasing of glazing panels from supporting frames, and more specifically to the releasing of laminated glazing panels from supporting frames (such as laminated vehicle windscreens or architectural window panes).

BACKGROUND OF THE INVENTION

Reference to glazing panels should be understood to mean panels, screens, or windows of glass, plastics or any other material substantially transparent to wavelengths in the visible range of the spectrum.

Vehicle windscreens typically comprise a laminated panel structure comprising an outer glass layer, an inner glass layer and an interlayer, interposed between the outer and inner glass layers. The interlayer typically comprises a material transparent to some wavelengths of visible light but absorbent to ultraviolet radiation (U.V). (In some circumstances the inter layer may be absorbent to some wavelengths of visible light and also typically some infra red radiation.) The inter layer is typically tinted to absorb specific wavelengths (particularly U.V.).

WO-A-9617737 discloses a method and apparatus for releasing bonded transparent screens (typically vehicle windscreens) from supporting frames to which they are bonded. An improved technique has now been devised.

SUMMARY OF THE INVENTION

According to a first aspect, the invention provides a method of releasing a glazing panel from a frame to which the panel is bonded by interposed bonding material, the method comprising:

i) arranging light energy delivery means adjacent the glazing panel; and, ii) operating the light energy delivery means to transmit light energy through the screen to effect release of the panel from the frame.

According to a second aspect the invention provides apparatus for releasing a glazing panel from a frame to which the panel is bonded by interposed bonding material, the apparatus comprising light energy delivery means arrangeable adjacent the glazing panel, and operable to transmit light energy through the screen to effect release of the panel from the frame.

The light energy delivered is preferably of a wavelength substantially in the range 300 nm–1500 nm (more preferably in the range 400 nm–700 nm).

The light energy delivered is desirably pulsed according to a predetermined regime, preferably such that the pulse duration (T on) is less than the inter-pulse interval (T off).

Desirably, a single pulse of light energy delivered is of sufficient energy to effect separation of the screen from the frame along a length of the bonding material.

The apparatus preferably includes a pulse forming network (which may include a capacitor and inductor arrangement) to drive the apparatus to produce a light pulse. The apparatus preferably further comprises a trigger network for initiating operation of the pulse forming network.

Control means is preferably provided for controlling one or more apparatus parameters including the minimum permissible time elapsing between subsequent light pulses. The control means is therefore preferably linked to the trigger network and/or the pulse forming network.

It is preferred that means is provided for selectively adjusting the intensity of the light delivered. This is important in view of the differing degree to which various tinted glazing panels absorb light energy in the wavelength range contemplated. It is preferred that the apparatus includes different preset parameter settings which may be switched dependent upon the glazing panel tint to be de-bonded.

The light energy may be absorbed at the bonding material/panel interface either by the bonding material itself, or by an absorbing layer comprising the panel (such as the frit layer commonly found on vehicle glazing panels) or by a suitable light absorbent coating provided at the interface.

The light energy delivery means may be tracked about the periphery of the panel, preferably at a predetermined rate dependent upon the power of the light energy delivery means and the pulse regime. Advantageously tracking means (preferably motorised tracking means) is provided for this purpose.

Alternatively, the light energy delivery means may be hand held and positioned on the glazing manually by an operator. The delivery means may therefore have a manual trigger for initiating a light pulse when the delivery head is positioned to the operators satisfaction.

In one embodiment, the light energy delivered comprises a plurality of wavelengths, most preferably in the visible range of the spectrum. In one embodiment it is preferred that the light energy is non-coherent. The light energy preferably attenuates rapidly with distance such that at a few centimeters (prefeably less than 10 cm, more preferably less than 5 cm) from the energy delivery means the light energy density is significantly diminished from its maximum value (preferably falling to 50% maximum value or below). The pulse repetition frequency (defining T off) is beneficially substantially in the range 0.1 Hz–10 Hz (most preferably substantially in the range 0.3 Hz–1 Hz). The energy delivered is preferably substantially in the range 100 Joules–10,000 Joules per pulse (more preferably in the range 500–1500 Joules per pulse). The pulse duration (T on) is preferably substantially in the range 1 $\mu$s–100 ms, more preferably 1 ms–2 ms.

In a preferred embodiment, the energy delivery means comprises electrical gas discharge apparatus. Desirably, operation of the gas discharge apparatus is controlled to limit the pulse rate and/or duration of the light pulse. The operation of the gas discharge apparatus is preferably controlled by:

i) charging a capacitor arrangement;

ii) initiating a trigger pulse to discharge the capacitor arrangement; and, iii) discharging the capacitor arrangement through an inductor to the gas discharge apparatus.

Accordingly, for this preferred embodiment, apparatus according to the invention includes energy delivery means comprising electrical gas discharge apparatus.

The electrical gas discharge apparatus is controlled to limit the pulse rate of the light delivered. The apparatus preferably includes a pulse forming network having a capacitor and inductor arrangement in which the capacitor discharges through the inductor to drive the electrical gas discharge apparatus to produce a light pulse. The apparatus preferably further comprises a trigger network for initiating the capacitor of the pulse forming network to discharge.

Control means is preferably provided for controlling one or more apparatus parameters including the minimum permissible time elapsing between subsequent discharge pulses of the electrical gas discharge apparatus.

The electrical gas discharge apparatus preferably comprises an electrical gas discharge tube.

The electrical gas discharge apparatus desirably comprises a reflector (preferably a parabolic reflector) arranged to direct emitted light in a predetermined direction.

The apparatus preferably includes a window through which emmited light is directed to pass through the glazing panel.

In an alternative embodiment, the energy delivery means comprises laser energy delivery means operated to transmit laser radiation through the panel to effect release of the glazing panel from the frame, the laser being operated in quasi continuous wave mode in which a series of discrete pulses of radiation are transmitted.

The pulse regime for the laser is preferably such that the pulse duration (T on) is substantially in the range 100 $\mu$s–10 ms and the inter-pulse interval (T off) substantially in the range 100 $\mu$s–10 ms.

In a preferred embodiment, the average laser power is 60 W–150 W±10% (typical peak power 600 W±20%); the laser tracking speed is preferably in the range 12 mm/S±20%.

In either embodiment, the apparatus may comprise focussing means arranged to focus the light energy at a predetermined location. For laser delivery means the laser radiation may be focussed to a line, preferably having a line width substantially in the range 200–800 $\mu$m (preferably substantially 600 $\mu$m±20%). Advantageously the line length is substantially in the range 10 mm±20%. Where a greater line length is required a composite line comprising a plurality of focussed lines may be generated and arranged in end to end relationship. It is believed that the use of laser radiation focussed to a line for the purpose of releasing a glazing panel from a screen is novel and inventive per se.

Desirably, the tracking and quasi-continuous pulsed operation of the laser delivery means is coordinated such that the focussed line moves transversely to its longitudinal direction (that is the line moves in the direction of its width) at a rate such that subsequent pulses of the focussed line overlap. Preferably the degree of linewidth overlap of subsequent pulses is substantially 50% or above (more preferably substantially 80% or above). Operation in this manner ensures good separation of the panel from the frame at the bonding material/panel inner layer interface.

It is preferred that the laser energy delivery means comprises a plurality of laser sources, advantageously arranged in one or more arrays. The laser energy delivery means preferably comprises laser diode means.

It has been found that for laminated screens or panels comprising a tinted interlayer in particular, operation of the light energy delivery means in pulsed mode according to the pulsing regime defined herein (quasi continuous wave mode for the laser delivery means embodiment), provides enhanced results, because energy absorption in the body of the screen or panel, particularly at the interlayer, is minimised.

The invention will now be further described in specific embodiments by way of example only and with reference to the accompanying drawings.

BRIEF DESCRIPTION OF THE DRAWINGS

FIG. 7 is a schematic representation of an alternative embodiment of exemplary apparatus according to the invention performing the method according to the invention;

FIG. 8 is schematic representation of the apparatus of FIG. 7 in side elevation; and, FIG. 9 is a schematic representation of the beam tracking showing overlap of the beam widthwise for subsequent laser pulses for the embodiment of FIGS. 7 and 8.

DESCRIPTION OF THE PREFERRED EMBODIMENTS

Figure 1:
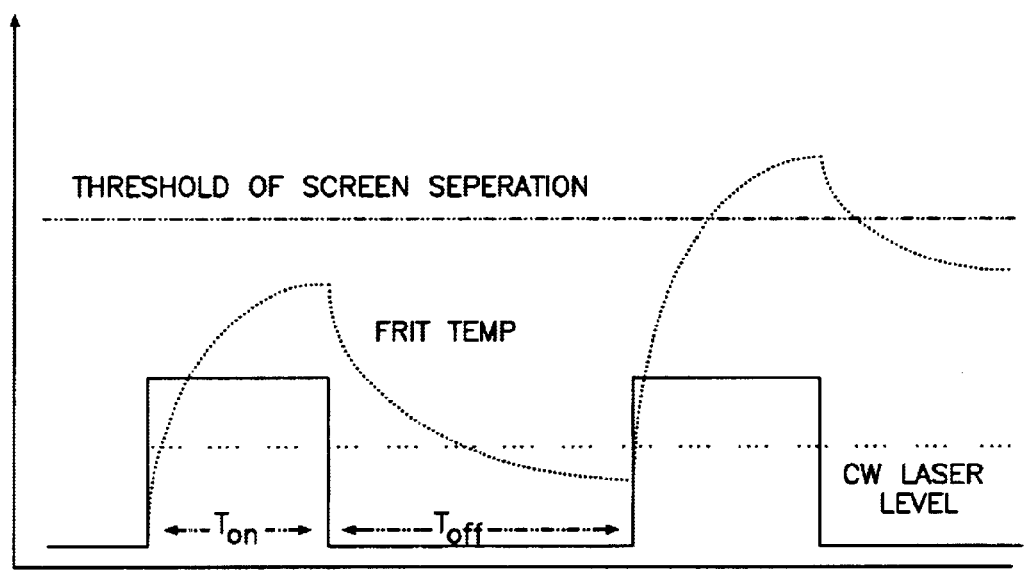
FIG. 1 is a diagrammatic representation showing pulsed light operation of the light energy and the effect on glazing panel and frit temperature.

In the application shown, the apparatus 1 is used to release a vehicular glazing panel (windscreen 16) from a supporting frame 7 to which it is bonded by an interposed, dark coloured polyurethane bonding bead 8 which extends around the entire periphery of the panel 16 in contact with frame 7.

The windscreen panel 16 comprises an outer glass layer 9, an inner glass layer 10 and intermediately therebetween, an interlayer 11 comprising a tinted sheet material which is transparent to certain wavelengths of visible light but opaque to others and also to ultra violet (U.V.) radiation. The purpose of the interlayer 11 is to provide structural strength for the windscreen 16 such that in the event of impact the screen remains intact, and also to provide a U.V. barrier.

Immediately adjacent the bonding bead 8, the periphery of the inner layer 10 of the windscreen panel 16 is provided with a bonded glass frit layer 12 which is typically dark in colour (more typically black in colour). The purpose of the frit layer is to inhibit the passage of ultraviolet radiation through the screen to impinge upon the polyurethane bonding bead 8 which is typically degradable upon exposure to UV radiation.

Figure 2:
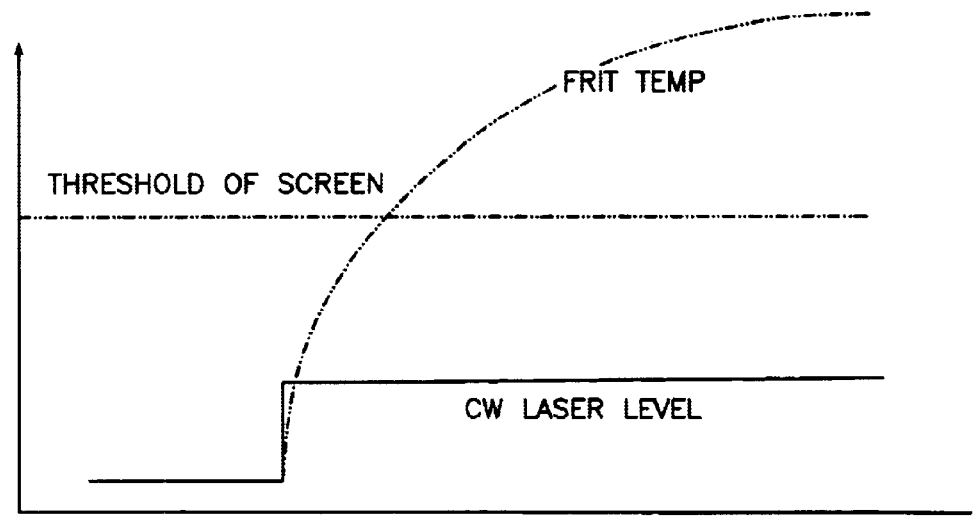
FIG. 2 is a representation similar to that shown in FIG. 1 showing prior art continuous wave laser radiation and the effect on frit and glazing panel temperature.

FIGS. 1 and 2 compare light pulsed in accordance with the preferred pulsing regime of the present invention (which will be described in detail hereafter), with continuous wave laser operation known from the prior art system disclosed in WO-A-9617737, and the associated effect on the temperature of the frit layer 12 in relation to threshold of glazing panel integrity (particularly delamination at the panel interlayer 11).

The use of continuous wave laser radiation results in excess heat build-up within the body of the panel 16, particularly at the interlayer 11. This has the effect that increased power is required than would be the case where significant heat build up does not occur within the body of panel 16. Furthermore, the heat build-up within the body of panel 16 at interlayer 11 has been found to result in glass fracture in the region of the interlayer, which increases the absorption within the body of panel 6 leading to a "chain event" in which increasingly greater amounts of energy delivered is absorbed within the body of the panel 16. This results in less energy reaching the frit layer 12/bonding bead 8 interface, thereby reducing the effectiveness of the separation.

The use of pulsed light operation provides repeated bursts of energy to be delivered to the frit layer 12/bonding bead 8 interface, with sufficient time between pulsed energy bursts (T off) to allow heat absorbed within the body of the glazing panel (including at interlayer 11) to be dissipated.

Figure 3:
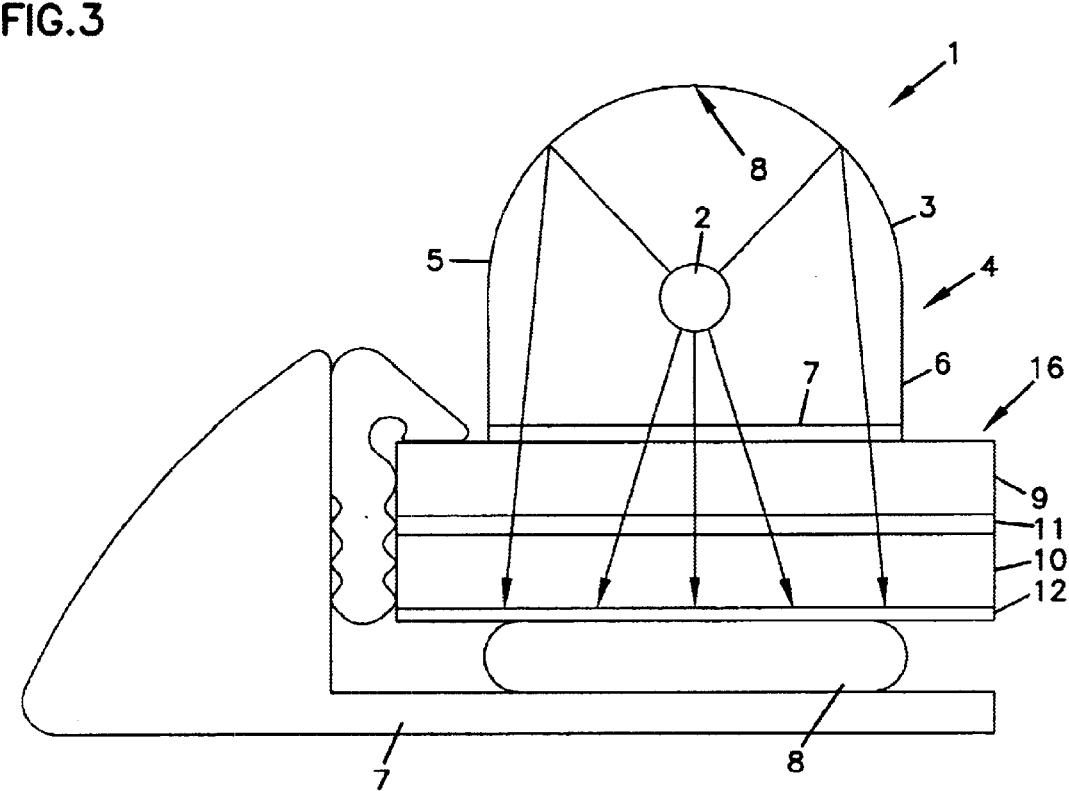
FIG. 3 is a schmatic representation of a first embodiment of light energy delivery means according to the invention.

Referring to FIG. 3, the apparatus generally designated 1 comprises a delivery head 4 including an electric gas discharge tube 2 containing a high pressure Noble/inert gas such as Xenon or Krypton. Discharge tube operates to produce an output burst of light of a range of wavelengths in the visible spectrum (approximately in the range 400 nm to 700 nm). The energy delivered, per pulse is typically in the range 500–1500 Joules however the energy disipates (attenuates) rapidly with distance from the tube. (This is an important operational aspect, as will be described further below).

A housing/casing 3 surrounds the discharge tube and includes shielding sidewalls 5, 6 and a spanning visible light transmissible window 7. A parabolic reflector wall 8 is positioned opposite the window 7 to reflect light from the reverse side of discharge tube 2 to pass through the window 7.

Figure 4:
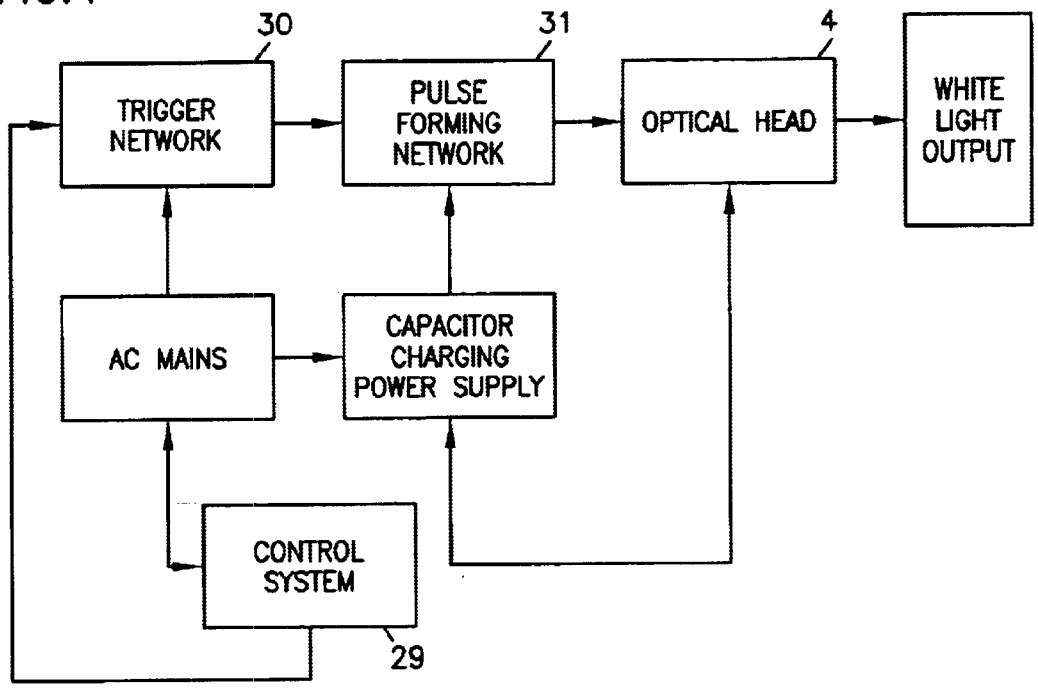
FIG. 4 is a system diagram of a apparatus including the light energy delivery means of FIG. 3.

Referring to FIG. 4, the tube is controlled to produce high intensity pulses according to a predetermined pulse regime by means of a control unit 29 operating to apropriate programmed instructions. Control unit 29, controls the operation of a trigger network 30 to activate a pulse forming network 31 to supply current to the tube 2 to produce a light pulse having the desired characteristics.

Figure 5:
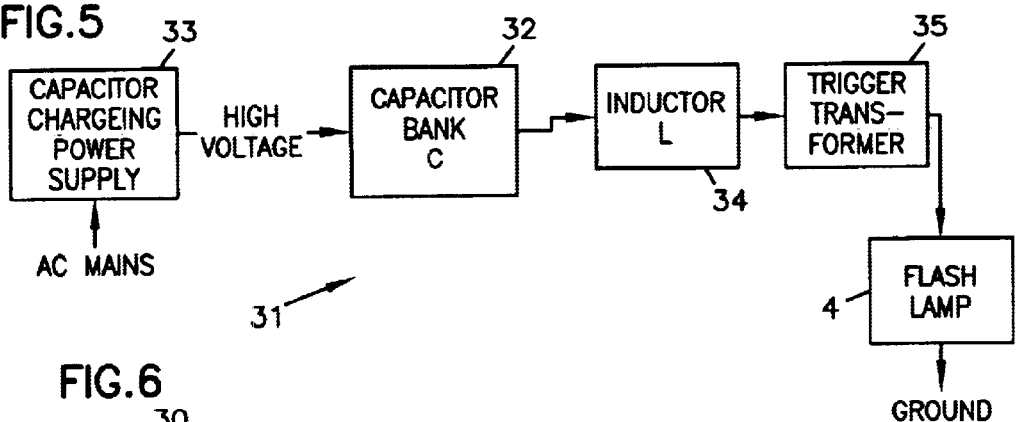
FIG. 5 is a block diagram of the pulse forming network of the system shown in FIG. 4.
Figure 6:
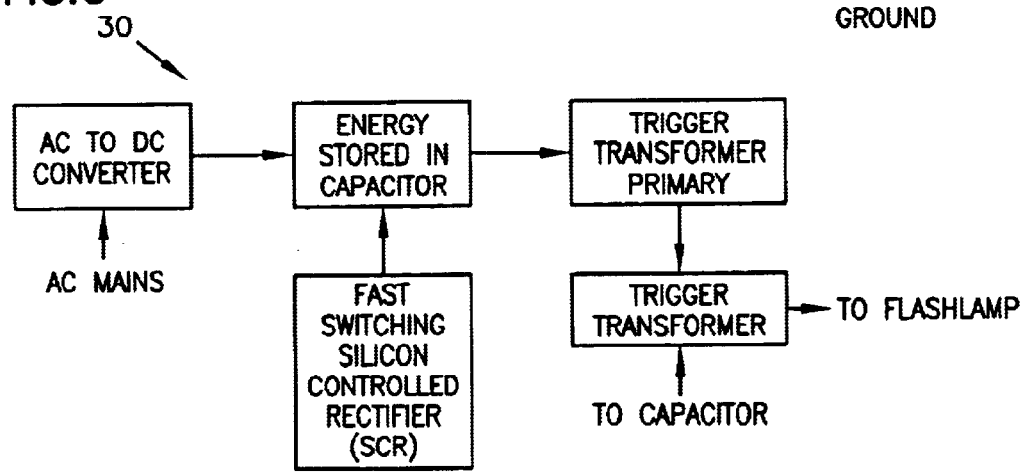
FIG. 6 is a block diagram of the trigger network of the system shown in FIG. 4

Referring to FIG. 5, the pulse forming network 31 includes a capacitor bank 32 charged to a preset voltage by a power supply 33. The capacitor bank 32 remains charged until a trigger pulse from the trigger network initiates discharge in the discharge tube 2, when charge stored in capacitor bank 32 discharges through inductor 34 and a secondry trigger transformer 35, to the tube 2. The time constant of the discharge (and hence the light pulse duration and "profile") is determined by the values of the inductor 34 and capacitor bank 32. For an operational system a pulse duration of 1 ms–2 ms has been found to be suitable. For present purposes, pulse duration should be understood to be the time interval between the light power reaching half its maximum value and subsequently falling to half its maximum value. The required pulse duration varies depending upon the optical properties of the glazing panel to be released. For example different glazing tints require different levels of energy to be supplied to effect release, and hence different pulse durations and also different power levels. The capacitor bank 32 and inductor 34 can therefore be reset to appropriate values depending upon the glazing panel to be released in order to modify the "profile" and power of the pulse delivered. The apparatus may be provided with preset settings selectable by the operator (or automatically) appropriate to common glazing tints or other known variables. To adjust the optical power of the apparatus the capacitor charging power supply may be varied.

The pulse repetition frequency (corresponding to the length of the inter-pulse interval (T off)) is important to ensure that the period between successive pulses is sufficient to allow the heat absorbed in the thickness of the screen to dissipate before more energy is delivered. The control unit 29 acts to override the manual trigger to inhibit the trigger network 30 from initiating discharge until the required time period has elapsed. The pulse repitition frequency is typically controlled to be in the range 0.3 Hz–1 Hz.

The energy delivered per light pulse is selected according to the tint or other qualities of the glazing panel but typically varies between 500–1500 Joules per pulse.

Because non-laser light is used, the energy attenuates rapidly with distance from the optical head 4 and is therefore sufficient to effect debonding of the glazing panel but less susceptible to unauthorised or accidental operator misuse. This is an important safety feature of using this embodiment.

In use, the optical delivery head is positioned as shown in FIG. 3 and a manually actuatable trigger is operated to produce a single light pulse which passes through the screen 6 and is absorbed at the frit layer 12 and/or the bonding bead 8. The frit 12 or bonding bead rapidly heats up and separates from the screen typically either by glass ablation, temperature carburisation of the bead 8, or other thermal mechanisms. Typically a single shot/pulse is sufficient to effect release over a length of screen corresponding to the length of the discharge tube 2 (typically 5–15 cm) although multiple shots may be used (for example at lower power to minimise frit damage). The operator then moves on to an adjacent portion of the screen periphery before instigating a further light pulse. The procedure is repeated about the entire width of the screen to effect complete release.

It has been found that significantly improved results are achieved where the light delivered is in the visible range of the spectrum, and the light is pulsed according to a regime in which a series of discrete pulses of light are transmitted, the pulse duration (T on) being substantially in the range 1 $\mu$s to 100 ms (more preferably in the range 1 ms–2 ms) and the pulse repitition frequency being substantially in the range 0.1 Hz–10 Hz (more preferably in the range 0.3 Hz–1 Hz).

Use of the pulsing regime described herein and lower wavelengths of light (in the visible spectrum)have been found to provide significantly enhanced results in which a greater proportion of the energy delivered is concentrated at the frit layer 12/bonding bead 8 interface, and excess heat build-up (and associated glass fracture) at interlayer 11 is avoided or at least ameliorated.

Referring to the apparatus shown in FIGS. 7 to 9, a six bar array of laser diodes 102 is provided within a housing 103 mounted in a delivery head 104 of the apparatus. The diode array comprises two banks each comprising three diodes 102; focussing optic 105 is provided to focus the beams produced by each bank of diodes 102 to form respective focussed lines (approx. 25 to 30 mm from optics 5) arranged in end to end relationship.

The laser delivery head 104 is used to deliver laser radiation through the screen, being focussed to line by the focussing optic 105 (as described above) in order for energy to be concentrated at the frit layer 112. Separation of the panel 106 from the frame 107 is effected as a result of energy absorption at the frit layer 112/bonding bead 108 interface resulting in rapid heating and either cleavage or degradation of the frit material 112 comprising the panel 106, or degradation of material comprising the bonding bead 108 (or degradation of a primer coat applied to the glazing panel prior to installation in contact with the bonding bead). The release mechanism may comprise a combination of the mechanisms described.

In the apparatus shown in FIGS. 7 to 9, the preferred laser parameters for quasi continuous wave operation are as follows:

Wavelength 808 nm;

Peak power 600 watts;

Average power 120 watts (20% duty cycle)

T on—1 ms;

T off—4 ms;

Repetition rate 200 hertz.

The preferred requirements for the optical arrangement 105 are to produce a line focussed beam having the following characteristics:

Focal length 25–30 mm;
Line length on screen 20 mm (comprising 2×9 mm and 1 mm space between);
Line width 600 µm (average).

In one embodiment, the delivery head 104 is carried by a motorised tracking system (not shown) arranged to track the head 104 about the entire periphery of glazing panel 106 to effect complete release of the panel 106 from frame 107. The operation of the tracking system 104 and laser delivery by head 104 are co-ordinated (by control means—not shown) such that the speed of tracking about the frame is maintained at a predetermined rate.

As shown in FIG. 9 it is an important feature for optimum performance that subsequent pulses of the line focussed beam 121a, 121b overlap widthwise; the greater degree of overlap, the more improved the separating capacity. As shown in FIG. 9, for a system having the above identified parameters, the translational speed of the beam could be 6.6 mm per second, which would result in the beam moving widthwise by a distance of 33 µm per pulse. For a beam of 600 µm width this would provide a beam overlap of approximately 95%.

The invention has primarily been described in relation to releasing of laminated glazing panels. It will however be understood that the invention is equally suitable for use with other glazing panels providing similar benefits in minimising overheating of material comprising the panel.

We claim:

1. A method of releasing a glazing panel from a frame to which the panel is bonded by interposed bonding material, the method comprising:
   i) arranging an electrical gas discharge light delivery apparatus adjacent the glazing panel; and,
   ii) operating the electrical gas discharge light delivery apparatus to transmit light energy through the panel to effect release of the panel from the frame.

2. A method according to claim 1, wherein the light energy delivered is of a wavelength substantially in the range 300 nm–1500 nm.

3. A method according to claim 2, wherein the light energy delivered is of a wavelength substantially in the range 400 nm–700 nm.

4. A method according to claim 1, wherein the light energy delivered comprises a plurality of wavelengths.

5. A method according to claim 1, win the light energy delivered is pulsed according to a predetermined regime.

6. A method according to claim 5, wherein the pulse duration (T on) is substantially in the range 11 s–100 ms.

7. A method according to claim 6, wherein the pulse duration is substantially in the range 1 ms–2 ms.

8. A method according to claim 1, wherein the pulse repetition frequency is substantially in the range 0.1 Hz–10 Hz.

9. A method according to claim 1, wherein the pulse repetition frequency is substantially in the range 0.3 Hz–1 Hz.

10. A method according to claim 1, wherein the pulse duration (T on) is less than the inter-pulse interval (T off).

11. A method according to claim 5, wherein a single pulse of light energy delivered is of sufficient energy to effect separation of the panel from the frame along a length of the bonding material.

12. A method according to claim 1, wherein the electrical gas discharge lift delivery apparatus is hand held and positionable relative to the glazing panel manually by an operator.

13. A method according to claim 1, wherein the light energy attenuates rapidly with distance such that at a few centimeters from the electrical gas discharge light delivery apparatus the light energy density is significantly diminished from its maximum value.

14. A method according to claim 13, wherein at a distance substantially in the range 5 cm or less from the electrical gas discharge light delivery apparatus the light energy density is 50% of its maximum value or below.

15. A method according to claim 1, wherein the light energy is non-coherent.

16. A method according to claim 1, wherein operation of the electrical gas discharge light delivery apparatus is controlled to limit either one of the pulse rate or duration of the light pulse.

17. A method according to claim 16, wherein the operation of the electrical gas discharge light delivery apparatus is controlled by:
   i) charging a capacitor arrangement;
   ii) initiating a trigger pulse to discharge the capacitor arrangement; and
   iii) discharge the capacitor arrangement through an inductor to the gas discharge apparatus.

18. Apparatus for releasing a glazing panel from a frame to which the panel is bonded by interposed bonding material, the apparatus comprising an electrical gas discharge light delivery apparatus arrangeable adjacent the glazing panel, and operable to transmit light energy through the panel to effect release of the panel from the frame.

19. Apparatus according to claim 18, wherein the electrical gas discharge light delivery apparatus is controllable to pulse the light energy delivered.

20. Apparatus according to claim 19, wherein the electrical gas discharge light delivery apparatus is controllable to either one of adjust or limit at lease one of:
   the pulse repetition rate of the light energy delivered;
   the pulse duration of the light energy delivered; and
   the light energy intensity delivered.

21. Apparatus according to claim 18, wherein the electrical gas discharge light delivery apparatus includes a manual trigger for initiating a light energy pulse.

22. Apparatus according to claim 18, wherein means is provided for selectively adjusting the intensity of the light energy delivered.

23. Apparatus according to claim 18, wherein the electrical gas discharge light delivery apparatus includes a pulse forming network having a capacitor and inductor arrangement in which the capacitor discharges through the inductor to drive the electrical gas discharge light delivery apparatus to produce a light pulse.

24. Apparatus according to claim 23, including a trigger network for initiating the capacitor of the pulse forming network to discharge.

25. Apparatus according to claim 19, including control means for controlling the minimum permissible time elapsing between subsequent discharge pulses of the electrical gas discharge light delivery apparatus.

26. Apparatus according to claim 18, wherein the electrical gas discharge light delivery apparatus comprises an electrical gas discharge tube.

27. Apparatus according to claim 18, wherein the electrical gas discharge light delivery apparatus comprises a reflector arranged to direct emitted light in a predetermined direction.

28. Apparatus according to claim 18, where the electrical gas discharge light delivery apparatus comprises a window through which emitted light is directed to pass through the glazing panel.

29. A method of releasing a glazing panel from a frame to which the glazing panel is bonded by interposed bonding material, the method comprising the steps of:

directing at least one light output pulse from an electric gas discharge tube via an optical delivery head at a wavelength to be absorbed by either one of the bonding material or a frit layer on an inside face of the glazing panel about a periphery thereof and conforming to the frame;

moving the optical delivery head to adjacent portions of the glazing panel along a path of either one of the frit layer or the bonding material; and repeating the at least one light pulse to effect release of the glazing panel from the frame.

30. A glazing releaser for releasing a glazing panel from a frame to which the glazing is bonded by interposed bonding material said glazing panel releaser comprising:

an optical delivery head to direct light at either one of the bonding material or a frit layer on an inside face of the glazing panel about a periphery thereof and conforming to the frame; and at least one electric gas discharge tube operable to produce the light directed by said optical delivery head in the form of at least one light pulse at a wavelength to be absorbed by either one of the frit layer or the bonding material to effect release of the glazing panel from the frame.

* * * * *